Dec. 22, 1936.   J. CANETTA   2,065,210
QUICK SERVICE CONTROL VALVE
Filed Oct. 11, 1935
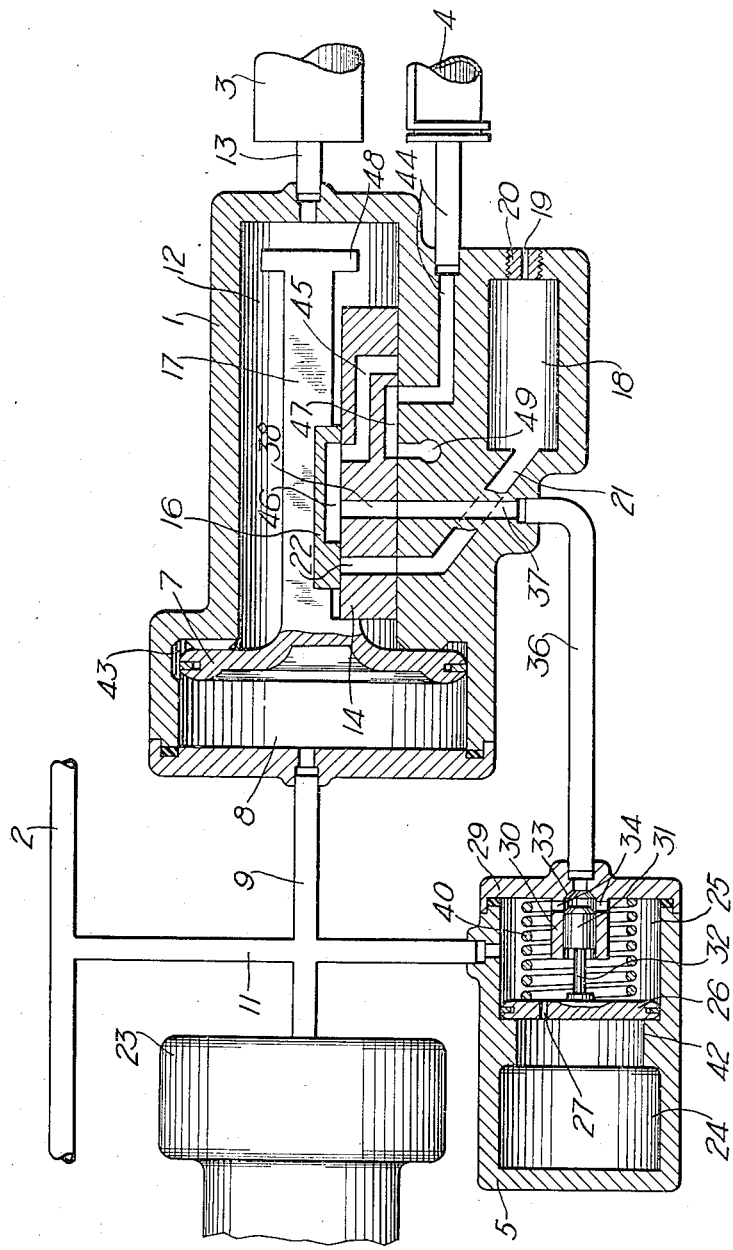
INVENTOR
JOHN CANETTA
BY *Wm. M. Cady*
ATTORNEY Patented Dec. 22, 1936

2,065,210

UNITED STATES PATENT OFFICE 2,065,210

QUICK SERVICE CONTROL VALVE

John Canetta, Wilkinsburg, Pa., assignor to The Westinghouse Air Brake Company, Wilmerding, Pa., a corporation of Pennsylvania Application October 11, 1935, Serial No. 44,489

11 Claims. (Cl. 303—37)

This invention relates to fluid pressure brakes, and particularly to the type operative upon a reduction in brake pipe pressure to effect an application of the brakes, and upon an increase in brake pipe pressure to effect the release of the brakes.

In effecting a service application of the brakes on a long train equipped with a brake system of the above type, having quick service means associated with the brake equipment on each car for effecting local reductions in brake pipe pressure to accelerate the propagation of the wave of reduced brake pipe pressure throughout the train so as to produce quick serial action of the triple valves, there may be a tendency for the local quick service reductions in brake pipe pressure to augment the reduction in brake pipe pressure of a service degree initiated at the engineer's brake valve, particularly on cars at or near the rear end of the train, where local venting of brake pipe fluid to the quick service bulbs is known to occur in greater amount and at a faster rate than that effected near the middle portion of the train, due to lack of sustaining brake pipe volume. In order to avoid the possibility that a reduction in brake pipe pressure thus augmented might approach a degree likely to effect an undesired emergency application of the brakes, it is desirable to check the cumulative effect of local quick service reductions in brake pipe pressure when the normal margin between the service and emergency rates is apt to be dangerously decreased.

The principal object of my invention is to provide means operative, in case the reduction in brake pipe pressure reaches a predetermined degree in excess of the rate and amount obtained in a normal service reduction, to prevent further quick service action of the triple valve devices from creating a reduction in brake pipe pressure such as to effect an undesired emergency application of the brakes.

In the accompanying drawing, the single figure is a diagrammatic sectional view of a fluid pressure brake equipment embodying my invention.

As shown in the drawing, the fluid pressure brake equipment on each car of the train comprises a triple valve device 1, a brake pipe 2, an auxiliary reservoir 3, a brake cylinder 4, and according to my invention, a quick service control valve device 5.

The triple valve device 1 comprises a casing containing a piston 7 having on one side a piston chamber 8 connected through a pipe 9 and a pipe 11 with the brake pipe 2, and having on the other side a valve chamber 12 connected through a pipe 13 with the auxiliary reservoir 3. A main slide valve 14 and a graduating valve 16 are contained in the valve chamber 12, the piston 7 being adapted to operate said valves through the medium of a stem 17.

Formed in the casing of the triple valve device 1 is a quick service bulb or chamber 18, which is open to the atmosphere through a restricted passage 19 in a choke plug 20, and with the triple valve parts in their release position, as shown in the drawing, a passage 21, leading to said bulb, registers with a port 22 in the main slide valve 14, which port, in this position, is lapped by the graduating slide valve 16.

It will be understood that, in addition to the quick service feature of the triple valve device disclosed herein, a quick service means of the type operating in a final quick service stage to vent fluid from the brake pipe when the triple valve parts are in service application position, such as that disclosed in a patent to C. C. Farmer, No. 2,031,213, dated Feb. 18, 1936, may be employed in the equipment embodying my invention. It will further be understood that, although only a simplified form of triple valve device is illustrated in the drawing, the brake equipment may include a quick action means, represented in outline at 23, which may be of any suitable type operative upon an emergency rate of reduction in brake pipe pressure to effect a local reduction in brake pipe pressure at an emergency rate.

The quick service control valve device 5 comprises a casing in which a piston 26 is mounted, said piston having a pressure chamber 24 at one side, and a piston chamber 25 at the opposite side which is connected through the pipe 11 to the brake pipe. Said piston has a restricted port 27 for permitting communication between said chambers. Secured to the casing for closing the piston chamber 25 is a cover plate 29 having an inwardly extending sleeve portion 30, having a bore in which a valve 31 is slidably mounted, which valve is operatively connected by a stem 32 to the piston 26. The valve 31 is adapted to engage a seat 33 formed within the sleeve portion for closing a communication leading from the piston chamber 25 through passages 34 to a quick service pipe 36, which is connected in release position of the slide valve 14 through a passage 37 in the triple valve casing 1 to a port 38 in the main slide valve 14 leading to the seat of the graduating slide valve 16. A spring 40, which is disposed in the piston chamber between the piston 26 and the end plate 29, is adapted to urge said piston into engagement with an interior shoulder 42 formed on the casing between the chambers 24 and 25, thereby normally maintaining the valve 31 unseated.

In operation, fluid under pressure supplied to the brake pipe 2 in the usual manner flows through pipes 11 and 9 to the chamber 8 in the triple valve device 1, and with the piston 7 in release position, as shown in the drawing, thence flows past said piston through the usual feed groove 43 to the valve chamber 12 and by way of the pipe 13 to the auxiliary reservoir 3.

Fluid under pressure also flows from the brake pipe 2 through the pipe 11 to the piston chamber 25 in the quick service control valve device 5, and through the restricted port 27 in the piston to the pressure chamber 24, charging said chamber with fluid at the pressure maintained in the brake pipe.

With the parts of the triple valve device 1 in release position as shown in the drawing, the brake cylinder 4 is connected by way of a pipe and passage 44 and a cavity 47 in the main slide valve 14 to an atmospheric exhaust port 49.

When the pressure of fluid in the brake pipe 2 is reduced at a service rate in the usual well known manner to effect a service application of the brakes, a corresponding reduction in the fluid pressure in the piston chamber 8 of the triple valve device 1 and in the piston chamber 25 of the quick service control valve device 5 is effected, said chambers being connected to the brake pipe as hereinbefore described.

The spring 40 in the piston chamber 25 is adapted to act against the piston 26 with a force such as to prevent said piston from being operated by the fluid pressure in the chamber 24 to close the valve 31, unless the brake pipe pressure is reduced at such a rate that the rate of reduction in brake pipe pressure exceeds the rate at which fluid can flow from the chamber 24 through the restricted port 27 to the piston chamber 25 so that a differential pressure is created in the chamber 24, the rate of reduction in brake pipe pressure at which the piston 26 is adapted to be moved against the pressure of spring 40 by the differential pressure in chamber 24, being preferably less than an emergency rate but somewhat greater than the usual service rate of reduction in brake pipe pressure.

Upon the reduction in the pressure of fluid in the chamber 8 of the triple valve device 1, the pressure of fluid in the valve chamber 12 moves the piston 7 to the left, closing the feed groove 43. Through the medium of the stem 17, the piston 7 first shifts the graduating valve 16 relatively to the main slide valve 14, thereby uncovering a service port 45 in the main slide valve and establishing a communication between the passages 22 and 38 by way of a cavity 46 in the graduating valve.

Fluid under pressure is then permitted to flow from the brake pipe 2 by way of the pipe 11, chamber 25 in the quick service control valve device 5, passage 34, past the open valve 31, through the quick service pipe 36, passage 37, port 38, cavity 46, port 22 and passage 21 to the quick service bulb 18. The initial quick service flow of fluid from the brake pipe to the quick service bulb 18 is at a fast rate until the brake pipe pressure substantially equalizes into said bulb, thereby producing a rapid limited quick service reduction in fluid pressure in the brake pipe 2 for initially hastening the operation of the triple valve device on the next car in the train. The quick service reduction in brake pipe pressure then continues at a slower rate as governed by the restricted passage 19, so that movement of the local triple valve parts to service position is ensured.

As the piston 7 continues movement to the left, a lug 48 on the end of the stem 17 engages the main slide valve 14, so that said valve is shifted in the same direction. In thus moving from the initial quick service position, the main slide valve laps the quick service ports 33 and 22, cuts off the communication from the brake cylinder passage 44 to the atmosphere, and finally connects said brake cylinder passage with the service port 45. Fluid under pressure is then permitted to flow from the auxiliary reservoir 3 through the pipe 13, valve chamber 12, service port 45, and passage and pipe 44 to the brake cylinder 4, effecting a service application of the brakes.

It will thus be seen that, when the pressure of fluid in the brake pipe is reduced a normal service amount in effecting a service application of the brakes, the quick service control valve device 5 is adapted to permit the usual operation of the quick service means, so that the desirable functioning of said means to provide high transmission speed of serial action of the triple valve devices throughout the train is permitted.

To release the brakes, the brake pipe pressure is increased in the usual manner and the increased brake pipe pressure flows therefrom through the pipes 11 and 9 to the chamber 8 in the triple valve device 1. The increased fluid pressure acting in the chamber 8 operates the piston 7 so as to move said piston and the slide valves 16 and 14 to the release position. With the main slide valve 14 in release position, fluid under pressure is vented from the brake cylinder 4 by way of the pipe and passage 44, cavity 47 and atmospheric exhaust port 49.

If the rate of reduction in brake pipe pressure is sufficiently high so that a differential pressure is created in chamber 24 due to the rate of reduction in brake pipe pressure exceeding the rate at which fluid can flow from the chamber 24 through the restricted port 27 to the piston chamber 25, then when said differential pressure in chamber 24 slightly exceeds the opposing pressure of spring 40 plus the reduced fluid pressure in piston chamber 25, the piston 26 will be shifted to the right against the spring 40, thereby moving the valve 31 into engagement with the seat 33. It will be understood that on the above excessive reduction in brake pipe pressure, fluid under pressure is vented from the chamber 25 at a rate faster than that at which fluid under pressure is permitted to flow from the chamber 24 through the restricted port 27 in the piston 26.

The reduction in fluid pressure in the chamber 8 of the triple valve device 1 causes the piston 7 to operate in the manner already described so as to move the graduating valve 16 to the quick service position, thereby establishing the communication between the quick service pipe 36 and the vented bulb 18. Since, however, the seated valve 31 prevents flow of fluid from the brake pipe 2 to the quick service pipe 36, the local quick service reduction in brake pipe pressure is checked, thus preventing further increase in the rate of brake pipe reduction. With the local quick service venting of brake pipe fluid to bulb thus effectively cut out, the possibility of an undesired emergency reduction in brake pipe pressure is avoided.

The above described reduction in brake pipe pressure will be sufficient to ensure rapid operation of the triple valve ports to service position, in which position the quick service venting communication to the quick service bulb 18 is cut off. Thereafter, when the flow of fluid through the restricted port 27 in the piston 26 has produced substantial equalization of the opposing pressures acting on said piston, the spring 40 operates said piston to open the valve 31. The quick service control valve device is thus adapted to reestablish communication between the brake pipe 2 and the quick service pipe 36, for permitting normal functioning of a final stage quick service feature, such as that hereinbefore noted, in case such feature is employed in the equipment embodying my invention.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, a brake controlling valve device operated upon a reduction in brake pipe pressure for effecting an application of the brakes, quick service means operated upon a gradual reduction in brake pipe pressure for effecting a local reduction in brake pipe pressure, and means operative when the rate of reduction in brake pipe pressure exceeds a predetermined rate for preventing said quick service means from acting to effect a local reduction in brake pipe pressure.

2. In a fluid pressure brake, in combination, a brake pipe, a brake controlling valve device operated upon a reduction in brake pipe pressure for effecting an application of the brakes, quick service means operated upon a gradual reduction in brake pipe pressure for effecting a local reduction in brake pipe pressure, and means controlling communication through which said quick service means vents fluid from the brake pipe and operative upon a rate of reduction in brake pipe pressure exceeding the service rate of reduction by a predetermined amount to close said communication.

3. In a fluid pressure brake, in combination, a brake pipe, a brake controlling valve device operated upon a reduction in brake pipe pressure for effecting an application of the brakes, quick service means operated upon a gradual reduction in brake pipe pressure for effecting a local reduction in brake pipe pressure, a valve controlling communication through which said quick service means vents fluid from the brake pipe, and a movable abutment subject to the opposing pressures of the brake pipe and a chamber adapted to be charged with fluid under pressure through a restricted port for operating said valve to close said communication at a predetermined rate of reduction in brake pipe pressure.

4. In a fluid pressure brake, in combination, a brake pipe, a brake controlling valve device operated upon a reduction in brake pipe pressure for effecting an application of the brakes, quick service means operated upon a gradual reduction in brake pipe pressure for effecting a local reduction in brake pipe pressure, a valve controlling communication through which said quick service means vents fluid from the brake pipe, a spring, and a movable abutment subject on one side to brake pipe pressure and the pressure of said spring and on the opposite side to the pressure of fluid in a chamber adapted to be charged with fluid under pressure from the brake pipe through a restricted port for operating said valve to close said communication when the brake pipe pressure is reduced at a predetermined rate.

5. In a fluid pressure brake, in combination, a brake pipe, a triple valve device, quick service means included in said triple valve device operated upon a service reduction in brake pipe pressure to effect a local reduction in brake pipe pressure, and means operative upon a reduction in brake pipe pressure at a rate exceeding a predetermined rate to prevent said quick service means from effecting a local reduction in brake pipe pressure.

6. In a fluid pressure brake, in combination, a brake pipe, a triple valve device, quick service means included in said triple valve device operated upon a service reduction in brake pipe pressure to establish a communication from the brake pipe to a quick service chamber for effecting a local reduction in brake pipe pressure, and means subject to fluid under pressure supplied from the brake pipe and responsive to a reduction in brake pipe pressure at a rate exceeding a predetermined degree to prevent flow of fluid under pressure from the brake pipe to the quick service chamber.

7. In a fluid pressure brake, in combination, a brake pipe, a triple valve device, quick service means included in said triple valve device operated upon a service reduction in brake pipe pressure to establish a communication from the brake pipe to a quick service chamber for effecting a local reduction in brake pipe pressure, and means for controlling the functioning of said quick service means, comprising a normally open valve adapted to control communication from the brake pipe to the quick service chamber, and a movable abutment subject to the fluid pressure in a chamber and operative upon a reduction in brake pipe pressure exceeding a service rate to a predetermined extent to close said valve.

8. In a fluid pressure brake, the combination with a brake pipe and a triple valve device having means operative upon a service reduction in brake pipe pressure to establish a quick service communication through which brake pipe fluid is adapted to flow for effecting a local reduction in brake pipe pressure, of a control valve device comprising a normally open valve adapted to control said quick service communication and a movable abutment subject to brake pipe pressure and the opposing fluid pressure in a chamber having restricted communication with said brake pipe for operating said valve, whereby upon a rate of reduction in brake pipe pressure in excess of a service rate said control valve device is operative to close the quick service communication.

9. In a fluid pressure brake for a train, the combination with a brake pipe, a reduction in pressure in which is adapted to effect an application of the brakes, of means operative upon a predetermined reduction in brake pipe pressure to establish communication for venting fluid under pressure locally from said brake pipe, valve means having a normal open position and operative upon a reduction in brake pipe pressure exceeding the predetermined reduction to close said communication, and means arranged to effect the return of said valve means to the normal position.

10. In a fluid pressure brake, in combination, a brake pipe, a brake controlling valve device operated upon a reduction in brake pipe pressure to a quick service position and then to a service position for effecting an application of the brakes, quick service means conditioned when said controlling valve device is in the quick service position to effect a local reduction in brake pipe pressure, means controlling communication through which said quick service means vents fluid under pressure from the brake pipe and operative upon a rate of reduction in brake pipe pressure exceeding the service rate of reduction by a predetermined amount to close said communication, and means for operating the last named means to reopen said communication upon movement of said controlling valve device from the quick service position.

11. In a fluid pressure brake apparatus for a train, a brake pipe, a plurality of brake controlling valve devices operated upon a reduction in brake pipe pressure for effecting an application of the brakes throughout the train, quick service means on cars of the train adapted to be serially operated upon a gradual reduction in brake pipe pressure for effecting local reductions in brake pipe pressure, and means associated with the quick service means and operative upon a rate of reduction in brake pipe pressure exceeding the service rate of reduction by a predetermined degree at any car in said train to prevent the quick service means from effecting further local reductions in brake pipe pressure, whereby any cumulative effect of such local reductions in brake pipe pressure may be checked.

JOHN CANETTA.